Dec. 5, 1967 P. W. EVERMAN 3,356,941

ABSOLUTE MICROWAVE REFRACTOMETER

Filed Jan. 8, 1965

INVENTOR.
Paul W. Everman,
BY
H. H. Losche
Att'ys.

3,356,941
ABSOLUTE MICROWAVE REFRACTOMETER
Paul W. Everman, Indianapolis, Ind., assignor to the United States of America as represented by the Secretary of the Navy
Filed Jan. 8, 1965, Ser. No. 424,447
9 Claims. (Cl. 324—58.5)

ABSTRACT OF THE DISCLOSURE

A refractometer having one channel producing a reference frequency and a second channel producing a sweep frequency that is mixed with the reference frequency in the first channel and detected and passed through a bandpass filter to switch a multivibrator when a fixed difference in frequency exists, and the second channel sweep frequency being applied to a resonator cavity in the atmosphere, the resonated output of which is detected and applied to the multivibrator to switch it to its other state to produce a measure in multivibrator activation representative of the refractive index of the atmosphere.

The invention described herein may be manufactured and used by or for the Government of the United States of America for governmental purposes without the payment of any royalties thereon or therefor.

*Background of the invention*

This invention relates to refractometers and more particularly to refractometers to measure the index of refraction of the atmosphere at various and varying altitudes, as from an aircraft, to obtain profile refractometer readings for evaluation of microwave energy scattering occasioned by these changes in index of refraction of the atmosphere.

It is well known that radio waves at microwave frequencies are scattered somewhat by inhomogeneities in the index of refraction of the atmosphere. When this occurs compensating circuits, such as for radar transmission and reception, can be used to compensate for frequency changes resulting from atmospheric dielectric changes. One well known microwave refractometer utilizes two transmission resonant cavities, one of which is sealed to provide a reference cavity and the other of which is open to the atmosphere to be sampled. A reflex klystron, oscillating near the resonant frequency of the two resonant cavities, is frequency modulated with a linear sawtooth reflector voltage in such a manner that it excites each of the transmission cavities at their respective resonant frequencies, one during each excursion of the sawtooth. A crystal detector at the output of each resonant cavity develops a voltage pulse having the shape of the transmission response curve of the corresponding cavity. The resonant frequencies of the two cavities are made different so that the resulting pulses therefrom are displaced from each other in time. Any changes in the resonant frequency of the cavity open to the atmosphere due to atmospheric dielectric changes will change the displacement of the time pulse with respect to the time pulse from the reference cavity, thus providing means to calibrate the change in the index of refraction of the atmosphere. Such a system may be seen in the Review of Scientific Instruments, volume 21, No. 2, February 1950, pages 169–176.

*Summary of the invention*

In the present invention the klystron is replaced by a crystal controlled solid state oscillator and a solid state sweep frequency oscillator, and the reference cavity is replaced by a solid state mixer. By using solid state oscillators and mixer the power supplies, which are bulky and costly, can be eliminated. Since changes in temperature can produce changes in the frequency of the crystal controlled and sweep frequency oscillators, or in other of the solid state components, these components are housed in a temperature controlled compartment. In this manner the refractometer is held stable in frequency, eliminating errors inherent in refractometers employing reference cavities and klystrons, thereby providing an absolute microwave refractometer that is light in weight and of small size. It is therefore a general object of this invention to provide a solid state microwave refractometer having a single resonant sampling cavity responsive to frequency changes caused by atmospheric conditions that are compared with an absolute reference frequency to establish a continuous calibration of the absolute index of refraction of the atmosphere.

*Brief description of the drawing*

These and other objects and the attendant advantages, features, and uses will become more apparent to those skilled in the art as this description proceeds when considered along with the accompanying drawings, in which.

*Description of the preferred embodiment*

Figure 1:
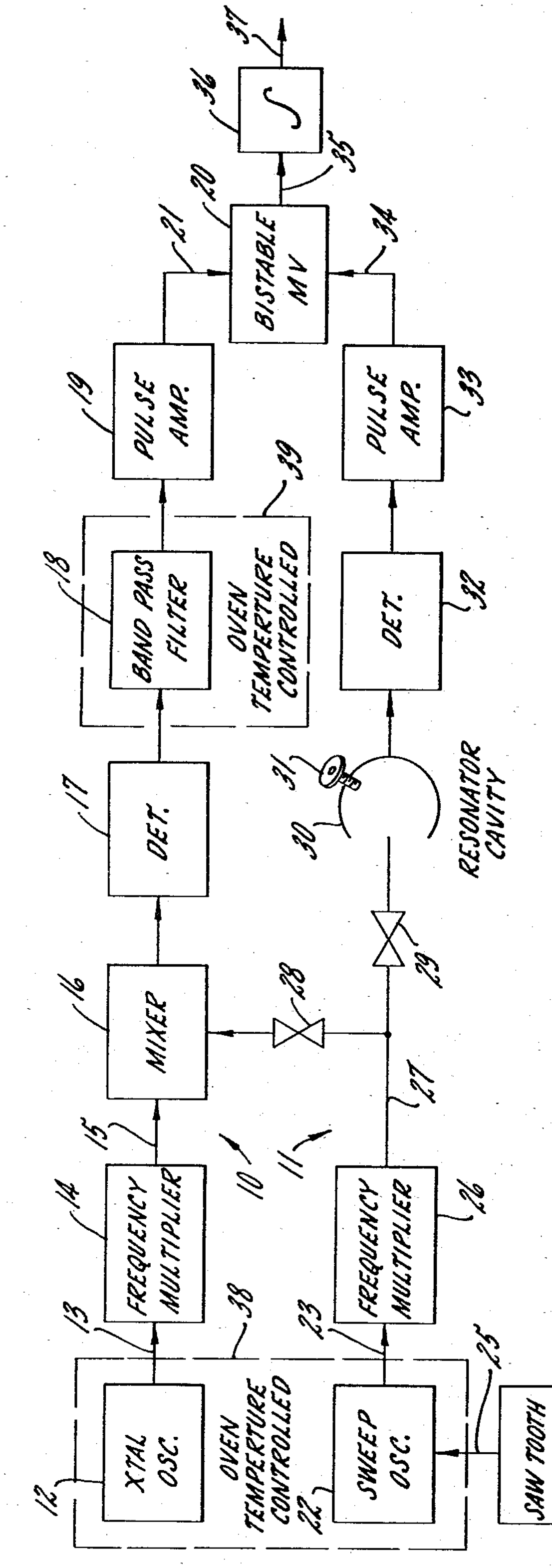
FIGURE 1 illustrates in block circuit schematic form the refractometer device of this invention.

Referring more particularly to FIGURE 1 of the drawing there is shown a block circuit schematic of the invention in which two channels are used, one channel 10 providing the reference frequency and the other channel 11 providing the sampling frequency. In the reference channel 10 a crystal controlled oscillator 12 provides stable oscillations on its output 13 to a frequency multiplier 14. The frequency multiplier 14 has an output 15 as one input to a mixer 16. A detector 17 is coupled to the output of the mixer 16 and the detected output is coupled through a bandpass filter 18 and a pulse amplifier 19 to a bistable multivibrator 20 by way of an output conductor 21.

In the sampling channel 11 a sweep oscillator 22 produces a sweep in its oscillations on its output 23 in accordance with a sweep voltage provided by a sawtooth generator 24 applying sawtooth voltages over its output 25 to frequency modulate this sweep oscillator 22. The sweep oscillations on the sweep oscillator output 23 are multiplied in a frequency multiplier 26 to produce sweep oscillations on its output 27 which begin at the same frequency as are produced on the output 15 of the frequency multiplier 14. These sweep oscillations are applied through a ferrite isolator 28 as the second input to mixer 16 and are applied by a branch conductor means through a ferrite isolator 29 to a resonator cavity 30 open to the atmosphere and positioned to be subject to the atmosphere to be sampled for index of refraction. The resonator cavity 30 is diagrammatically illustrated herein as being frequency tunable by threaded adjustment means 31 to tune this cavity for different resonant frequencies. The resonator cavity 30 may be of any well-known design such as those shown and described in the text Microwave Measurements by Edward L. Ginzton, 1957, Sections 7.3 and 7.4. The output of the resonator cavity 30 is detected in a detector circuit 32, the output of which is passed through a pulse amplifier 33 to the bistable multivibrator 20 over the output 34. The output 21 of the pulse amplifier 19, serving as one input to the bistable multivibrator 20, and the output 34 of the pulse amplifier 33, serving as the other input to the bistable multivibrator 20, switch the bistable multivibrator to produce voltage and no-voltage states on an output 35 thereof. In this particular application the bistable multivibrator 20 is preferably of the Eccles-Jordan flip-over type in which one input, such as 21, will produce a voltage state over the output 35 and a triggered input over the input conductor 34 will trigger the multivibrator 20 to a no-voltage state on its output 35. The output 35 of the bistable multivibrator is conducted through an integrator circuit 36 to its output 37 to sum or average the voltages applied by the bistable multivibrator 20.

The block circuit schematic diagram shown in FIGURE 1 is provided with solid state components and, accordingly, some components are critical in that they are readily modified in their operation by temperature changes. For example, the crystal oscillator 12, the sweep oscillator 22, and the bandpass filter 18 could each produce considerable error in the system by changing operating temperatures. Accordingly, these three components, 12, 18, and 22, are placed in a chamber which is temperature controlled to maintain the operating temperature constant. The components 12 and 22 are illustrated as being in an oven temperature controlled area or chamber 38 while the bandpass filter 18 is illustrated as being in an oven temperature controlled area or chamber 39 although in actual practice these three components probably would be physically enclosed in a single oven temperature controlled chamber for simplicity in design and compactness.

*Operation*

Figure 2:
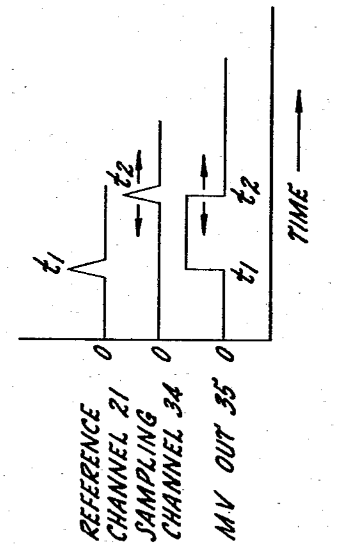
FIGURE 2 shows a time scale of the various outputs of the respective components in FIGURE 1.

In the operation of the device of FIGURE 1, with occasional reference to FIGURE 2 as it applies to certain outputs in FIGURE 1, let it be assumed that the crystal oscillator is capable of producing a stabilized oscillation of 97.875 megacycles. Let it further be assumed that the frequency multiplier is designed to multiply ninety-six times to produce on the output 15 of the frequency multiplier a frequency of 9,396 megacycles. Let it also be assumed for the purpose of example herein that the sweep oscillator 22 is designed to produce a sweep frequency, in accordance with the sweep voltage produced by the sawtooth generator 24, from 97.875 megacycles up to 98.021 megacycles on the output 23. The frequency multiplier 26 is designed to multiply the frequency ninety-six times in the same manner as the frequency multiplier 14. This will produce an output sweep frequency from 9,396 megacycles up to 9,410 megacycles. The reference frequency on the output 15 and the sweep frequency on the output 27 through the ferrite isolator 28 are mixed in the mixer 16, the mixed frequency of which will be detected in the detector 17 and applied to the bandpass filter 18. Let it further be assumed that the bandpass filter 18 has a bandpass of eight megacycles which will produce an output pulse to the pulse ampifiler 19 whenever the sweep oscillator frequency is a fixed difference from the stable oscillator frequency as determined by the center frequency of the bandpass filter 18. This output pulse will be amplified in the pulse amplifier 19 and conducted by way of the conductor means 21 to set the bistable multivibrator to produce an output voltage on the output conductor means 35 for integration by the integrator circuit 36.

At the same time that the sweep oscillator frequency over the output conductor 27 in the sampling channel is passed to the mixer 16, this sweep frequency is also conducted through the ferrite isolator 29 to the resonator cavity 30. Since the resonator cavity 30 is open to the atmosphere for sampling the dielectric changes of the atmosphere, this cavity 30 will resonate at one frequency of the sweep frequency producing an output pulse which is detected by the detector 32, pulse amplified in 33, and applied over 34 as the second input to the bistable multivibrator 20. While it may be understood that the resonator cavity 30 could be caused to resonate at some sweep frequency prior to the point at which the bandpass filter 18 would pass the fixed difference pulse between the stable and sweep frequencies, the bandpass filter is so designed and the resonator cavity is so tuned by the adjustable slug 31 to always cause the sampling channel to reach resonance in the resonator cavity after the bandpass filter pulse output. Accordingly, as shown in FIGURE 2, top line, the reference pulse coming out of channel 10 over the output conductor 21 as an input to the multivibrator 20 establishes the pulse at a time $t_1$ to switch the multivibrator 20 to produce the leading edge of the square wave output of multivibrator 20 on the output 35, as shown in the third line of FIGURE 2. The multivibrator 20 will remain in this state until the sampling channel 11 produces an output pulse over the conductor means 34 to the multivibrator 20 switching same to the no-voltage state at time $t_2$ as shown in FIGURE 2. The multivibrator 20 will produce on its output 35 square wave voltages from $t_1$ to $t_2$ which square wave voltages will repeat for each excursion of the sweep voltage output of the sweep oscillator 22. As the atmosperic conditions cause a change in the refractive index of the atmosphere within the resonator cavity 30, the resonant point along the sweep voltage from 9,396 megacycles to 9,410 megacycles will change shifting $t_2$ to the right or the left depending on this change of refractive index of the atmosphere. Accordingly, the analog voltage on the output 37 of the integrator circuit 36 will vary up or down in amplitude in accordance with the refractive index changes in the atmosphere within the resonator cavity 30. The atmospheric index of refraction is known to change over about 400 N units, or more, where:

$$N(\text{unit})=(n-1)\times 10^6$$

In prior known devices discussed, supra, temperature changes or the operating temperatures of the various solid state components would cause as much as 10 N units change in the index of refraction from the true values producing almost intolerable errors. In the present invention the oven temperature controlled components (most subject to producing errors) have been found to hold the errors within about one-tenth N unit over repeated samplings in the same environment. Accordingly, the present invention provides an absolute microwave refractometer capable of providing a profile of refractive indices for the atmosphere to be measured. For example, the device of FIGURE 1 may be installed in an aircraft in which the resonator cavity 30 will be placed externally of the aircraft to be subject to the ambient atmosphere for measurement of the refractive index resulting from dielectric changes of the atmosphere or from changes in altitude.

While many modifications and changes may be made in the constructional details and features of this invention to provide the absolute measurement of the index of refraction of the atmosphere, it is to be understood that I desire to be limited only in the scope of the appended claims. It is also to be understood that other values of frequency may be generated and multiplied to suit the conditions of the microwave refractometer and the invention is to be in no way limited to the specific example given.

I claim:

1. An absolute microwave refractometer comprising:
   an oscillator for generating oscillations of a stable frequency;
   a sweep oscillator for generating oscillations repeatedly sweeping over a predetermined range;
   mixing means coupled to said oscillator and sweep oscillator producing a mixed frequency in one channel;
   a sampling resonator cavity in the atmosphere and coupled to said sweep oscillator to produce an output in a second channel when said cavity resonates;
   a detector and a narrow bandpass filter in series in said one channel coupled to said mixer to produce an output pulse whenever said stable frequency and said sweep frequency beat in a predetermined mixed frequency;
   a detector coupled to said cavity in said channel to detect said resonated frequency; and means coupled to said one and second channels to produce a voltage representative of the time interval of occurrence of a pulse from said second channel with respect to a corresponding pulse in said one channel whereby a change in frequency produced by the atmosphere can be measured and calibrated.

2. An absolute microwave refractometer as set forth in claim 1 wherein said means includes a switching means switchable to produce an output voltage on an output thereof when a pulse is received from said one channel and to be cut off when a pulse is received from said second channel, and an integrator coupled to the switching means output averaging the voltage output of said switching means to produce a voltage calibrated to determine the index of refraction of the atmosphere.

3. An absolute microwave refractometer comprising:

an oscillator;

a sweep oscillator for producing pulses over a short frequency range;

means mixing the oscillations from said oscillator and sweep oscillator;

a sampling microwave cavity in an atmosphere to be sampled, said sampling microwave cavity being coupled to receive sweep oscillations from said sweep oscillator to produce an output when one frequency of said sweep oscillations resonates in said cavity;

first detector means for detecting the output of said mixing means and second detector means for detecting the resonant frequency pulse output of said cavity;

a narrow bandpass filter coupled to said first detector to pass a pulse at each occurrence of a predetermined fixed frequency difference;

a pulse amplifier coupled to each said narrow bandpass filter and said second detector to produce time related pulses; and means establishing an analog voltage proportional to the time interval between pulses from said mixing means and said cavity whereby the index of refraction of the atmosphere may be calibrated.

4. An absolute microwave refractometer as set forth in claim 3 wherein said means establishing an analog voltage includes a bistable multivibrator coupled to receive the pulses from said pulse amplifiers, the first occurring pulse producing a voltage output and the next occurring pulse cutting off the voltage output, the output of said bistable multivibrator being through an integrating circuit to average the voltage output.

5. An absolute microwave refractometer comprising:

a crystal controlled oscillator for generating oscillations of a stable frequency;

a sweep oscillator for generating oscillations repeatedly sweeping upwards in frequency from the frequency generated by said crystal controlled oscillator;

frequency multiplier means coupled one each to said crystal controlled oscillator and to said sweep oscillator multiplying each frequency an equal amount;

a mixer coupled to mix the two multiplied frequencies on an output thereof;

a first detector coupled to the output of said mixer to detect the mixed frequencies for each sweep of said sweep oscillator on an output thereof;

a narrow bandpass filter coupled to the output of said first detector to pass to an output thereof a pulse for each sweep of said sweep oscillator at a predetermined mixed frequency;

a sampling resonator cavity in the atmosphere and coupled to the frequency multiplier multiplying the frequency of said sweep oscillator to produce a frequency pulse signal as an output thereof when a resonant point is reached in each sweep frequency;

a second detector coupled to the output of said cavity resonator for detecting said frequency pulse signals;

a bistable multivibrator having two inputs and an output;

a pulse amplifier coupling each said bandpass filter output to one input of said bistable multivibrator and said second detector output with said other input of said bistable multivibrator to produce a voltage on said bistable multivibrator output for each pulse on said one input and to cut off said voltage on said bistable multivibrator output when a pulse is applied over said other input; and an integrator network coupled to said bistable multivibrator output to produce a direct current voltage directly proportional to the average of voltage output from said bistable multivibrator for calibration in atmospheric index of refraction.

6. An absolute microwave refractometer as set forth in claim 5 wherein said crystal oscillator, said sweep oscillator, and said first detector are temperature stabilized.

7. An absolute microwave refractometer as set forth in claim 5 wherein said coupling of said frequency multiplier of said sweep oscillations to said mixer and to said sampling resonator cavity is through ferrite isolating means.

8. An absolute microwave refractometer as set forth in claim 5 wherein said sampling resonator cavity is adjustable to change the resonance point thereof.

9. An absolute microwave refractometer as set forth in claim 5 wherein a sawtooth generator controls said sweep oscillator in its sweep frequencies.

References Cited

UNITED STATES PATENTS

| | | | |
|---|---|---|---|
| 2,514,369 | 7/1950 | Buehler | 324—89 |
| 2,580,968 | 1/1952 | Sproull | 324—81 X |
| 2,792,548 | 5/1957 | Hershberger | 324—58.5 |
| 2,972,104 | 2/1961 | Ward | 324—58.5 X |

RUDOLPH V. ROLINEC, *Primary Examiner.*

P. F. WILLE, *Assistant Examiner.*